US008574346B2

(12) United States Patent
Monereau et al.

(10) Patent No.: US 8,574,346 B2
(45) Date of Patent: Nov. 5, 2013

(54) PSA METHOD USING A COMPOSITE ADSORPTION BED COMPRISING AN ADSORBENT AND PCM AGGLOMERATES

(75) Inventors: Christian Monereau, Paris (FR); Pluton Pullumbi, Versailles (FR); Vincent Gueret, Paris (FR)

(73) Assignee: L'Air Liquide Societe Anonyme pour l'Etude et l'Exploitation des Procedes Georges Claude (FR)

( * ) Notice: Subject to any disclaimer, the term of this patent is extended or adjusted under 35 U.S.C. 154(b) by 746 days.

(21) Appl. No.: 12/442,638

(22) PCT Filed: Aug. 31, 2007

(86) PCT No.: PCT/FR2007/051860
§ 371 (c)(1),
(2), (4) Date: Oct. 6, 2009

(87) PCT Pub. No.: WO2008/037904
PCT Pub. Date: Apr. 3, 2008

(65) Prior Publication Data
US 2010/0043635 A1  Feb. 25, 2010

(30) Foreign Application Priority Data
Sep. 25, 2006  (FR) .................................... 06 53928

(51) Int. Cl.
*B01D 53/02* (2006.01)
(52) U.S. Cl.
USPC ................................................ 95/96; 96/148
(58) Field of Classification Search
USPC ........................................................... 95/96, 148
See application file for complete search history.

(56) References Cited

U.S. PATENT DOCUMENTS

| 4,475,929 | A |   | 10/1984 | Fuderer |
| 4,834,780 | A |   | 5/1989  | Benkmann |
| 4,971,605 | A |   | 11/1990 | Tarman |
| 5,044,767 | A |   | 9/1991  | Gustafsson |
| 5,395,427 | A |   | 3/1995  | Kumar et al. |
| 5,582,029 | A |   | 12/1996 | Occhialini et al. |
| 5,676,732 | A |   | 10/1997 | Viramontes-Brown et al. |
| 5,858,057 | A |   | 1/1999  | Celada-Gonzalez et al. |
| 5,861,050 | A | * | 1/1999  | Pittel et al. ...................... 95/115 |
| 5,906,672 | A |   | 5/1999  | Michaels et al. |
| 6,103,143 | A |   | 8/2000  | Sircar et al. |
| 6,245,127 | B1 |  | 6/2001  | Kane et al. |
| 6,311,719 | B1 |  | 11/2001 | Hill et al. |

(Continued)

FOREIGN PATENT DOCUMENTS

| DE | 102004022798 | 11/2005 |
| EP | 1142623      | 10/2001 |

(Continued)

OTHER PUBLICATIONS

Search Report for PCT/FR2007/051860, Feb. 19, 2008.

(Continued)

*Primary Examiner* — Robert A Hopkins
(74) *Attorney, Agent, or Firm* — Elwood L. Haynes (57) ABSTRACT

A thermocyclic process having a short cycle time, typically a cycle time of less 30 minutes, especially a PSA (Pressure Swing Adsorption) process, using agglomerates that contain phase change materials (PCMs), so as to reduce the thermal effects that said thermocyclic process is subjected to during each cycle is provide.

23 Claims, 3 Drawing Sheets

(56) References Cited

U.S. PATENT DOCUMENTS

| | | |
|---|---|---|
| 6,432,170 B1 | 8/2002 | Chiang et al. |
| 6,488,747 B1 | 12/2002 | Keefer et al. |
| 6,500,236 B2 | 12/2002 | Suzuki et al. |
| 6,527,831 B2 | 3/2003 | Baksh et al. |
| 6,544,318 B2 | 4/2003 | Dee et al. |
| 6,562,103 B2 | 5/2003 | Sethna et al. |
| 6,629,525 B2 | 10/2003 | Hill et al. |
| 6,793,719 B2 | 9/2004 | Kim et al. |
| 7,037,358 B2 | 5/2006 | Babicki et al. |
| 7,618,477 B2 * | 11/2009 | Pullumbi et al. ............ 95/96 |
| 2006/0101997 A1 | 5/2006 | Py et al. |
| 2006/0144228 A1 | 7/2006 | Reiners et al. |

FOREIGN PATENT DOCUMENTS

| | | |
|---|---|---|
| EP | 1235630 | 9/2002 |
| EP | 1243048 | 9/2002 |
| EP | 1307278 | 5/2003 |
| EP | 1355717 | 10/2003 |
| EP | 1374972 | 1/2004 |
| EP | 1400275 | 3/2004 |
| EP | 1536128 | 6/2005 |
| FR | 2474660 | 7/1981 |
| FR | 2847586 | 5/2004 |
| JP | 2000354726 | 12/2000 |
| JP | 2003001061 | 1/2003 |
| WO | 9828013 | 7/1998 |
| WO | 9901202 | 1/1999 |
| WO | 0204076 | 1/2002 |
| WO | 0209848 | 2/2002 |
| WO | 03064009 | 8/2003 |
| WO | 03086586 | 10/2003 |
| WO | 03090903 | 11/2003 |
| WO | 2004030452 | 4/2004 |
| WO | 2004054493 | 7/2004 |
| WO | 2005005022 | 1/2005 |
| WO | 2005025722 | 3/2005 |
| WO | 2005028059 | 3/2005 |

OTHER PUBLICATIONS

Silas E. Gustafsson, Department of Physics, Chalmers University of Technology, S-412 96 Gothenburg, Sweden "Transient plane source techniques for thermal conductivity and thermal diffusivity measurements of solid materials", 1996.

Mattias Gustaysson, Ernest Karawacki, and Silas E. Gustafsson, Department of Physics, Chalmers University of Technology, University of Gothenburg, S-412 96 Gothenburg, Sweden "Thermal conductivity, thermal diffusivity, and specific heat of thin samples from transient measurements with hot disk sensors", 1996.

Steven G. Mayorga, Jeffrey R. Hufton, Shivaji Sircar, and Thomas R. Gaffney, Air Products and Chemicals, Inc., Allentown, Pennsylvania, Phase I Final Report, Jul. 1997 "Sorption Enhanced Reaction Process for Production of Hydrogen DOE-Air Products Cooperative Agreement Instrument # DE-FC36-956010059".

* cited by examiner

PSA METHOD USING A COMPOSITE ADSORPTION BED COMPRISING AN ADSORBENT AND PCM AGGLOMERATES

This application is a § 371 of International PCT Application PCT/FR2007/051860, filed Aug. 31, 2007.

BACKGROUND

1. Field of the Invention

The invention relates to a thermocyclic process having a short cycle time, typically a cycle time of less 30 minutes, especially a PSA (Pressure Swing Adsorption) process, using agglomerates that contain phase change materials (PCMs), so as to reduce the thermal effects that said thermocyclic process is subjected to during each cycle.

2. Related Art

The expression "thermocyclic process" refers to any cyclic process for which certain steps are exothermic, that is to say that are accompanied by a release of heat, whereas certain other steps are endothermic, that is to say are accompanied by a consumption of heat.

Typical examples of thermocyclic processes according to the present invention include:

- processes for gas separation by pressure swing adsorption such as the PSA (Pressure Swing Adsorption) process, the VSA (Vacuum Swing Adsorption) process, the VPSA (Vacuum Pressure Swing Adsorption) process and the MPSA (Mixed Pressure Swing Adsorption) process,
- any process that uses a chemical conversion coupled with pressure swing adsorption cycles as mentioned above, making it possible to shift the equilibrium of the chemical reactions.

The processes for separation via pressure swing adsorption rely on the phenomenon of physical adsorption and make it possible to separate or purify gases by pressure cycling of the gas to be treated through one or more adsorbent beds, such as a zeolite, activated carbon, activated alumina, silica gel, molecular sieve or similar bed.

Within the context of the present invention, the term "PSA process" is understood to mean, unless stated otherwise, any process for gas separation via pressure swing adsorption, using a cyclic variation of the pressure between a high pressure, known as the adsorption pressure, and a low pressure, known as the regeneration pressure. Consequently, the generic name PSA process is used equally to denote the following cyclic processes:

- VSA processes in which the adsorption is carried out substantially at atmospheric pressure, referred as "high pressure", that is to say between 1 bara and 1.6 bara (bara=bar absolute), preferably between 1.1 and 1.5 bara, and the desorption pressure, referred to as "low pressure" is below atmospheric pressure, typically between 30 and 800 mbara, preferably between 100 and 600 mbara;
- VPSA or MPSA processes in which the adsorption is carried out at a high pressure substantially greater than atmospheric pressure, generally between 1.6 and 8 bara, preferably between 2 and 6 bara, and the low pressure is below atmospheric pressure, typically between 30 and 800 mbara, preferably between 100 and 600 mbara; and
- PSA processes in which the adsorption is carried out at a high pressure significantly above atmospheric pressure, typically between 1.6 and 50 bara, preferably between 2 and 35 bara, and the low pressure is greater than or substantially equal to atmospheric pressure, therefore between 1 and 9 bara, preferably between 1.2 and 2.5 bara.

Mention will subsequently be made of a "RPSA process" to denote PSA processes having a very rapid cycle, in general less than one minute.

Generally, a PSA process makes it possible to separate one or more gas molecules from a gas mixture containing them, by exploiting the difference in affinity of a given adsorbent or, if necessary, of several adsorbents for these various gas molecules.

The affinity of an adsorbent for a gas molecule depends on the structure and on the composition of the adsorbent, and also on the properties of the molecule, especially its size, its electronic structure and its multipole moments.

An adsorbent may be, for example, a zeolite, an activated carbon, an activated alumina, a silica gel, a carbon-based or non-carbon-based molecule sieve, a metallorganic structure, one or more oxides or hydroxides of alkali or alkaline-earth metals, or a porous structure containing a substance capable of reacting reversibly with one or more gas molecules, such as amines, physical solvents, metallic complexing agents, metal oxides or hydroxides, for example.

Adsorption is an exothermic phenomenon, each molecule-adsorbent pair being characterized by an isosteric adsorption enthalpy or a reaction enthalpy in general. Symmetrically, desorption is endothermic.

Furthermore, a PSA process is a cyclic process comprising several sequential steps of adsorption and desorption.

Consequently, certain steps of the cycle of a PSA are exothermic, in particular the step of adsorption of the gas molecules adsorbed on the adsorbent, whereas other steps are endothermic, in particular the step of regeneration or desorption of the molecules adsorbed on the adsorbent.

The thermal effects that result from the adsorption enthalpy or from the reaction enthalpy lead, generally, to the propagation, for each cycle, of an adsorption heat wave limiting the adsorption capacities and a desorption cold wave limiting the desorption.

This local cyclic phenomenon of temperature fluctuations has a sizeable impact on the separation performances of the process, such as the productivity, the separation efficiency and the specific separation energy, as mentioned in document EP-A-1 188 470.

Thus, it has been shown that if the thermal fluctuations due to the adsorption enthalpy were completely eradicated, the productivity of certain current industrial $O_2$ PSAs would be improved by around 50% and the oxygen yield would be improved by 10%. Similarly, for other types of PSA, the attenuation of the thermal fluctuations would lead to a significant improvement in the separation performances.

Since this negative phenomenon was identified, several solutions have always been described in order to attempt to reduce it or eliminate it.

Thus, it has been proposed to increase the heat capacity of the adsorbent medium by addition of an inert binder, during the manufacture of the particles, by deposition of the adsorbent medium onto an inert core, by addition of particles that are identical to the adsorbent but inert. For example, in the case of an $O_2$ PSA process, the following has already been tested: adsorbing the nitrogen contained in the air onto a composite bed composed of zeolites 5A and 3A, which are only differentiated by the size of their pores: only those of zeolite 5A allow the adsorption of nitrogen, since those of zeolite 3A are too small in size.

Furthermore, the use of outside heating and/or cooling means has also been described for counter-balancing the thermal effects of the desorption or of the adsorption, such as the use of heat exchangers.

Thermal couplings between the adsorption and the regeneration phase has also been proposed, the adsorbent being positioned in the successive passages of a plate heat exchanger, the circulation of fluids then being organized so that the passages are alternatively in the adsorption phase and desorption phase.

Another solution that makes it possible to reduce the amplitude of the thermal fluctuations consists in adding to the adsorbent bed a phase change material (PCM) as described by document U.S. Pat. No. 4,971,605. In this way the heat of adsorption and of desorption, or some of this heat, is adsorbed in the form of latent heat by the PCM, at the temperature, or in the temperature range, of the phase change of the PCM. It is then possible to operate the PSA unit in a mode closer to isothermal.

In practice, the phase change materials (PCMs) act as heat sinks at their phase change temperature, or over their phase change temperature range between a lower phase change temperature and an upper phase change temperature.

PCMs may be organic, such as paraffins, fatty acids, nitrogen-containing compounds, oxygen-containing compounds (alcohol or acids), phenyls and silicones, or inorganic such as hydrated salts and metal alloys. The term PCM will be used to refer to one of these compounds in the pure state or any mixture containing one of these compounds (such as, for example, eutectic mixtures).

The heat adsorption capacity of a PCM is even greater when its latent heat is high. Generally, PCMs are used for their solid-liquid phase change.

In order to be able to handle the PCMs, whether they are in the solid or liquid state, they may be micro-encapsulated in a micron-sized solid shell, preferably based on polymers (melamine formaldehyde, acrylic, etc.).

Since paraffins in particular are relatively easy to microencapsulate, they are generally the PCMs of choice compared to hydrated salts, even if the paraffins have a latent heat generally lower than those of hydrated salts.

Furthermore, paraffins have other advantages such as the reversibility of the phase change, chemical stability, defined phase change temperature or defined lower and upper phase change temperatures (that is to say that there is no hysteresis effect), a low cost, limited toxicity and a wide choice of phase change temperatures depending on the number of carbon atoms and the structure of the molecule.

Microencapsulated paraffinic PCMs are in the form of a powder, each microcapsule constituting this powder being between 50 nm and 100 μm in diameter, preferably between 0.2 and 50 μm in diameter. Each microcapsule has a thermal conductivity of around 0.1 to 0.2 W/(m·K), depending on whether the paraffin is in the solid or liquid state inside the microcapsule.

Microencapsulated PCMs, available in powder form, cannot be introduced as is into an adsorbent bed since they would be carried along by the gas streams circulating in the adsorber.

Document EP-A-1 565 539 describes various ways of placing these microcapsules in the immediate vicinity of the adsorbent, namely one of the materials at the side, the surface or inside the other, so that they can play their part in storing/withdrawing the heat flows linked respectively to the adsorption and to the desorption.

However, the solutions described in this document cannot, or can only with difficulty, be applied industrially.

One problem that is faced then is in being able to use microencapsulated PCMs in an industrial PSA process for separation of gases by adsorption, in particular in a PSA process having a short cycle time, that is to say less than or equal to 30 minutes.

SUMMARY OF THE INVENTION

In other words, the present invention aims to provide an industrial solution for effectively using commercial adsorbent particles and PCM microcapsules in a PSA-type unit for the cyclic production of gas.

The present invention is then a PSA process for separating and/or purifying a gas mixture containing several constituents by adsorption, using one or more adsorbers that each contain at least one bed of adsorbent particles to adsorb at least one of the constituents of said gas mixture onto said adsorbent particles, each adsorber being subjected to adsorption/desorption cycles comprising steps of adsorption and of desorption, said at least one adsorbent bed contained in each adsorber comprises, in addition, particles of at least one phase change material (PCM), said PCM particles are in the form of agglomerates of several PCM microcapsules, said agglomerates being mixed with the adsorbent particles so as to form a composite bed comprising said adsorbent particles and said micro-encapsulated PCM agglomerates, characterized in that:

the density of the PCM agglomerates is different from the density of said at least one adsorbent with which they are mixed in the composite bed; and the ratio of the densities of the PCM agglomerates and of the adsorbent particles (Rdensity) in the composite bed is such that:

$$Rdensity \leq 5.5-(2 \cdot Rdiameter)$$

where:

Rdensity is the ratio of the densities of the PCM agglomerates and of the adsorbent particles;

Rdiameter is the ratio of the equivalent diameters of the PCM agglomerates and of the adsorbent particles; and the numerators and denominators of said Rdensity and Rdiameter ratios being chosen in order to have:

$$1 \leq Rdensity \leq 3.5 \text{ and } 1.0 \leq Rdiameter \leq 2.25.$$

Within the context of the invention, the term "agglomerate" is understood to mean a solid having a dimension greater than 0.5 mm manufactured according to one of the standard known techniques of powder agglomeration and which may assume various shapes, in particular a shape of a bead, extrudate, pellet, crushed material obtained by crushing and sieving blocks of larger dimensions, or a platelet obtained by cutting previously compacted sheets, or other shapes.

Moreover, the terms "density", "diameter", "Rdensity" and "Rdiameter" are defined subsequently in the description.

Depending on the case, the process of the invention may comprise one or more of the following characteristics:

the Rdensity ratio is such that:

$$Rdensity \leq 5-(2 \cdot Rdiameter),$$ the numerators and denominators of said Rdensity and Rdiameter ratios being chosen in order to have:

$$1 \leq Rdensity \leq 3.0 \text{ and } 1.0 \leq Rdiameter \leq 2.0;$$

the PCM agglomerates have a density between 400 and 1200 kg/m$^3$, preferably between 500 and 900 kg/m$^3$, preferably between 500 and 600 kg/m$^3$;

the PCM agglomerates have a diameter between 0.5 and 3 mm, preferably a diameter between 1 and 1.5 mm or between 2 and 3 mm;

the amount of PCM agglomerates introduced into an adsorber is not homogeneous over the entire volume of said adsorber, as explained later in the description;

the PCM contained in the PCM agglomerates is chosen from paraffins, fatty acids, nitrogen-containing compounds, oxygen-containing compounds (alcohol or acids), phenyls and hydrated salts or a mixture of these compounds;

the PCM agglomerates comprise a binder that represents less than 30% by volume of the PCM agglomerates, preferably the binder is chosen from clays, hydraulic binders (cements), polymers, adhesives, resins, to which carbon or metal fibers are optionally added;

the PCM agglomerates have a thermal conductivity greater than 0.3 W/(m·K);

the PCM agglomerates have a thermal conductivity greater than 0.5 W/(m·K), preferably greater than 0.8 W/(m·K);

the PCM agglomerate comprises or is formed from metallized micro-encapsulated PCMs;

the surface metallization is continuous or discontinuous, and/or is carried out on several PCM microcapsules;

the thermally conductive material deposited is a metal chosen from Cu, Ag, Fe, Ni, Pd, Al, Au, or an alloy incorporating at least one of these metals;

the process is chosen from $H_2$ PSA, $O_2$ PSA, $N_2$ PSA and $CO_2$ PSA processes and/or a gas rich in $H_2$, $O_2$, $N_2$, CO, $CO_2$ or mixtures thereof, preferably a gas containing at least 50% by volume of $H_2$, $O_2$, $N_2$, CO, $CO_2$ or mixtures thereof is produced;

several successive adsorption beds are used, at least one of which is a composite bed formed of PCM agglomerates mixed with the adsorbent particles;

the gas to be treated flows radially or axially in the adsorber containing the composite bed; and each adsorption/desorption cycle has a cycle time of less than 30 minutes.

DETAILED DESCRIPTION OF THE INVENTION

The present invention will be better understood with the aid of the following description given with reference to the appended figures.

In the context of the present invention, PCM agglomerates are therefore produced having a shape, diameter and density such that a mixture of adsorbent particles and of said agglomerates remains homogeneous in space and over time during the operation of the PSA unit.

It is known that mixtures of particles having different properties constitute metastable states capable of evolving in a complex manner when the medium is subjected to force fields, in particular to vibrations or shocks.

The adsorbent beds of a PSA unit are subjected to gas streams, the intensity and the direction of which vary from one step to the next. They are also subjected to transient phases that constitute the opening and closing of valves.

Generally, at least one of the streams entering or exiting an adsorption unit comes from or supplies a compression unit—compressor or vacuum pump—which transmits vibrations of variable frequency and intensity to the fluid. These phenomena create overall movements or local movements of the particles which must be taken into account during the dimensioning of the geometry of the adsorber.

Mention will be made, for example, of the use of an adsorbent guard to compensate for compaction, the determination of the minimum sections to avoid attrition of the particles, the use of wire meshes to avoid mixing adsorbents having different properties, or else the use of layers of ceramic beads to rest on the bed located underneath and thus prevent movements due to the circulation of the gas.

The change over time of a mixture of particles having different properties depends on a large number of parameters, namely not only the density and the shape or particle size, but also, in particular, the surface finish, the elasticity, the presence of interstitial gas, the moisture, the amplitude and frequency of the vibrations applied to the medium, etc.

Therefore, predicting the change in a mixture composed of particles having different properties is, in most cases, very difficult or even impossible to anticipate.

It follows therefrom that currently the precautions taken during the dimensioning of a unit using adsorbents are generally the result of empirical tests.

Thus, the ratio of the diameters of two successive layers of support beads is at most a factor of 2, for example ¾"-⅜" (i.e. 18-9 mm approximately) or ½"-¼"-⅛" (i.e. 12-6-3 mm approximately). The positioning of these layers may go from the largest particle size to the smallest or vice versa.

For example, an adsorbent having a diameter of 1.5 mm, used to stop the moisture, may be placed directly on support beads of 3 mm. It can be deduced therefrom that it is possible, under the typical operating conditions of an adsorption drying unit, to place an adsorbent having a density of around 650 to 800 kg/m$^3$ on top of a bed of support beads having a density of around 1450 kg/m$^3$ by respecting the factor of 2 for the respective diameters.

However, no information is available in the prior art on the inverse stability, that is to say support beads having a higher density than the layer of adsorbents on which they would be placed, nor on the possible change over time of mixtures of populations of particles having different properties.

Moreover, it is known that the manufacturers of adsorbents sieve their production in order to provide products that can be used industrially. From samples it is possible to measure the unit size of the particles and to realize that by taking the end groups, namely the smallest particles and the largest particles, containing at least 5% of the population, the difference in the diameters compared to the average diameter is in general around 10%. Since these particles are spherical and have the same composition, they of course have the same density.

It became apparent to the inventors of the present invention that, on the basis of this information, having to produce PCM agglomerates having a density approximately equal to that of the adsorbent particles with which it is desired to use them as a mixture and having a size very close, namely +/−10% maximum difference in diameter, was difficult because it was very restrictive and especially much too expensive industrially because each manufacture would have to be specific not only to a given PSA but also for one and the same PSA, specific to each layer of adsorbent since it is generally a multi-bed process, that is to say that uses several superposed or juxtaposed beds successively passed through by the gas.

The inventors of the present invention therefore undertook a series of tests using various adsorbents and particles, in particular having different densities taking into account the lack of information available on this subject, in order to obtain the necessary information for determining the properties that the PCM agglomerates must have in order to be mixed with the adsorbents used in the various PSA type processes, that is to say so that the initial mixture remains homogeneous over time and in space.

The approach consisted firstly in determining the mode of vibration (frequency, amplitude) to apply to the mixture of adsorbent and PCM particles in order to be representative of the functioning of industrial processes.

This point is paramount since the change in the system depends on these parameters. For one and the same initial mixture, it is recognized that depending on the nature of the vibrations, it is possible to obtain:

regions (frequency/amplitude) where the equilibrium is stable over time, that is to say that the metastable mixture remains in its initial state; and regions where the largest particles rise to the surface. This effect is known as the "Brazil Nut Effect"; and regions where the largest particles sink into the bed. This effect is called the "Reverse Brazil Nut Effect".

All the experiments mentioned above were carried out using a Fritsch laboratory sieve shaker and transparent parallelepipedal containers having a length of 120 mm, a width of 80 mm and a height of 80 mm.

The investigation of the adjustment of the sieve shaker in a manner representative of the adjustment made in industrial units consisted in:

visually reproducing on the free surface of the bed of particles, the appearance of an adsorbent bed under the dimensioning conditions, that is to say at the maximum circulation rate of the gas permissible without producing attrition; and verifying that with this adjustment, the adsorbent beds of different nature directly superposed industrially (that is to say without a separation mesh) were effectively stable and that conversely the systems that, from experience, require a separation mesh resulted in a mixture of particles under the effect of the vibrations when the two layers were just superposed without a separation mesh.

The investigation into the minimum diameter of an adsorber and therefore of the maximum permissible rate is one of the important points in the dimensioning of units for purification by adsorption taking into account its impact on the investment. The setting of empirical formulae involving the weight of the adsorbent bed and the pressure drop caused by the circulation of a gas through the bed was carried out previously by the inventors from tests using various adsorbents and various gas circulation conditions.

It became apparent, during these tests, that the approach of the maximum speed starting from which the particles are displaced and shaken up generating dust (attrition) is expressed by a vibration of a certain number of particles at the horizontal free surface of the bed without there being any displacement of the particles. It is generally admitted that the limit rate is when around 5% of the particles at the surface are subjected to these vibrations. The particles of the lower layers remain immobile apart from possibly at some very limited and localized points at the wall.

In order to define the operating parameters of the sieve shaker and to validate them as mentioned above, use was first made of the adsorbents and then the various pairs of beds corresponding to various gas purification or production processes.

In particular, for the purifications at the beginning of syngas or air separation cryogenic processes, use has been made of various zeolites, then direct superpositions of adsorbent beds, that is to say without a separation mesh, of activated alumina type surmounted by zeolite.

The zeolites used are 13× zeolites sold by Ceca, UOP and Zeochem, having a diameter between 1.5 and 3.3 mm, whereas the activated aluminas come from Engelhard, Porocel, UOP, Axens and Alcan, and correspond to particle sizes of 1.8 to 6 mm approximately.

The series of tests carried out led to a permanent vibration regime, a frequency of vibrations of 50 Hz and an amplitude of 0.15 to 0.5 mm approximately, depending on the adsorbent placed in the upper part, being adopted.

For particles having a diameter of 2 to 3 mm and densities of around 600 kg/m$^3$, the amplitude used was around 0.3 mm. It was decreased for smaller particles and increased for larger particles, the criterion being, for the permanent frequency of 50 Hz, to obtain the state described previously (localized vibrations without displacement of particles) for the upper layer.

The following tests consisted in finding the properties of different particles constituting a mixture that remains homogeneous when these particles are subjected to the vibrations thus defined. It will be observed that there are a priori other combinations of frequencies and amplitudes that make it possible to produce this type of study. The mode used corresponds to one of the possibilities for the equipment used making it possible to make fine adjustments.

In addition to the adsorbents used directly in the processes for purification or separation of gases by adsorption which have been cited above, use has also been made of calibrated glass beads having a particle size ranging from 1.5 to 10 mm and metallic beads having a diameter of a few millimeters.

Most of the tests consisted in studying systems using two types of particles A and B having different properties. Subsequently, only the two predominant parameters will be retained, namely the equivalent diameter and the density, although small differences in behavior depending on the surface finish in particular have been observed.

Hence, in the context of the present invention, the term "diameter" refers to the equivalent diameter of the particle. The term "equivalent diameter" of a particle is that of the sphere having the same specific surface area, the specific surface area being the surface area related to the volume of the particle in question.

Thus, for a rod having a diameter d and length l, an equivalent diameter De is obtained such that:

$$De=6 \cdot l \cdot d/(2 \cdot d + 4 \cdot l).$$

For a pellet such that d=l, the equivalent diameter is the diameter of the particle.

Generally, for most of the geometries of particles used of cylindrical type, an equivalent diameter is between 0.75 and 1.3 times the diameter of the cylinder.

For a spherical bead, the equivalent diameter is directly the diameter of the bead.

For a population of beads that are essential spherical but of which the diameters have a dispersion inherent to the industrial manufacturing process, a conventional definition is used: the equivalent diameter of a population of beads is the diameter of identical beads which for the same volume of bed would give the same total surface area. Specifically, as long as the distribution by diameter has been determined (that is to say that the various fractions Xi of diameter Di have been determined, preferably with i greater than or equal to 5 to obtain sufficient accuracy, for example by sieving or from image processing devices), the equivalent diameter is obtained from the equation:

$$1/De = \Sigma i (Xi/Di).$$

For crushed adsorbents, a form in which it is possible, in particular, to find certain activated carbons, the particles are assimilated into spheres, the diameter distribution of which is determined by sieving, then the preceding calculation equation is applied.

Moreover, in the context of the invention the term "density" is understood to mean the density of the bed of particles. This density may vary by a few % depending on the packing method. Generally, in the tests according to the invention, the density of the lower layer corresponds to a dense packing since the transparent containers were vibrated following packing with the first type of particles in order to make the free surface horizontal, while the deposition of the second layer of particles was carried out through a funnel, the end of which was just above the level of the layer already in place. In this way, the initial packing of this second layer is of "loose" type but the vibrations caused by the sieve shaker during its operation lead to a dense packing.

During the packing of industrial units, a dense type packing is generally produced, obtained by dropping the adsorbent particles from a sufficient height onto a baffle in order to generate a "shower".

For these reasons and as the obtention of the tamped density (dense packing) is better defined since it is the maximum density that it is possible to obtain, and is especially more reproducible than the bulk density, it is to the tamped density that reference will be made in the table and in the equations given below, and it will be denoted simply by the term "density" in the present description.

This density is obtained by slowly filling a graduated cylinder with particles so that each particle can, in theory, find its best position. In practice, a shower of particles is achieved by using, in the upper part of the cylinder, a large mesh sieve. Various techniques can be used that give similar results. All the measurements and tests were carried out on previously regenerated adsorbents, that is say in practice with an adsorbed water content less than or equal to 5%.

More specifically, the tests consisted in depositing, as described above, a first layer of particles A over a height of 30 to 50 mm, then a second layer of particles B over a more or less equivalent height, that is to say of around 30 to 50 mm, so as to approximately fill the container.

Initially, the tests were carried out by systematically inverting the layers of particles.

The observations related to the infiltrations at the wall, in the central part of the container to avoid the corner effects that are not representative of an industrial adsorber and also to the appearance or not of beads of another species at the surface or at the bottom.

The observation at the wall and at the upper surface of the adsorbent can be carried out while the container is being vibrated, the observation of the bottom itself being carried out by carefully lifting the container. The edge phenomena, namely the interpenetration of the layers at the wall, were identified during tests as "negligible", "acceptable" or "unacceptable", depending on whether no or little penetration was observed, that is to say limited to the equivalent of 2 or 3 layers maximum of particles of the other species, or a greater evolutive penetration reaching the bottom of the container.

Even if the penetration phenomenon at the wall may appear acceptable for an adsorber having a diameter of several tens of decimeters, or even generally of several meters, it has been possible to demonstrate that in places this phenomenon finished by effecting a growing part of the particulate medium causing segregations which would be unacceptable in the PSA processes envisaged. This phenomenon of movement at the wall is furthermore known and reputed in the literature as possibly eventually creating significant convection movements.

The appearance of beads of the other species at the free surface or at the bottom of the container has obviously been referenced as "unacceptable".

It was subsequently verified visually whether, when subjected to vibrations, the layers A and B then B and A did not mix together, that is to say whether the various criteria were acceptable in the two configurations, any mixture of particles A and B remained stable. This result was obtained by visual examination of the 6 observable surfaces.

Another important observation consisted in seeing whether the dynamics of the system could be slow, in particular the fall or rise movements of particles through the other bed. For the interesting cases, that is to say ones close to the desired equilibrium limits, the containers were kept for more than one hour on the sieve shaker, then the upper layer was gently displaced using a scraper in order to ensure that no particle from the lower layer was about to appear on the free surface.

A last interesting observation was that with our selections of particles and of vibratory mode, the two having been determined as being representative of industrial units, the system made up of small heavy particles over large light particles was the most critical system when the tests were defined by the ratio of the diameters and of the densities (ratios greater than 1 by definition, that is to say ratio of the largest diameter to the smallest, ratio of the highest density to the lowest, regardless of the various cases which may arise).

Thirty or so binary systems of particles corresponding to the critical regime—small heavy particles over large light particles—then made it possible to define a border between stable configurations and evolutive configurations leading to a segregation of particles.

Figure 1:
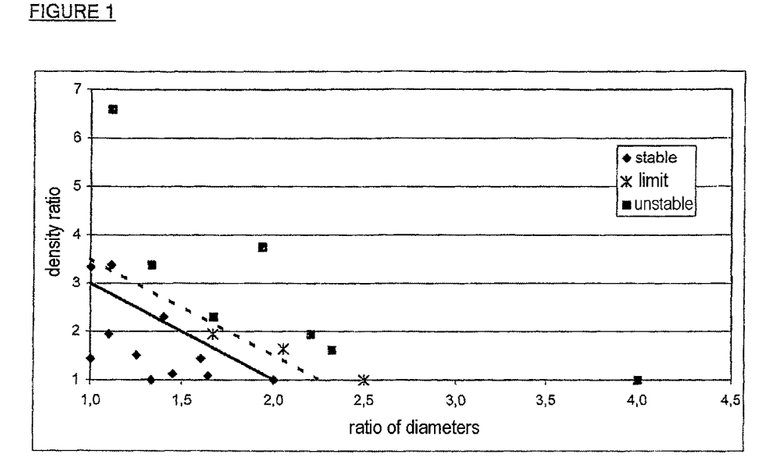
FIG. 1 illustrates the relationship between the ratio of the diameters of the particles and the ratio of the tamped densities of the two beds.

The appended FIG. 1 shows the results obtained with, on the x-axis, the ratio of the diameters of the particles (equivalent diameter of the particles of the lower layer/diameter of that of the particles of the upper layer) and, on the y-axis, the ratio of the tamped densities of the two beds (density of the upper bed/density of the lower bed).

In FIG. 1 it can be seen that there is a stable region for different density ratios, that is to say the region located under the straight line represented as a dotted line ( - - - ), which is considerably larger than that described in the prior art for the adsorbents used in a PSA process.

Furthermore, the straight line represented as a solid line (-) corresponds to a preferential region excluding certain limit cases which may appear in certain cycles and hence constitutes a guarantee of safety that makes it possible to ensure good operation of the PSA process, including during the transient steps.

The following table gives the properties of the various particles used to establish FIG. 1.

TABLE

| Material | Equivalent diameter (mm) | Tamped density (kg/m$^3$) |
|---|---|---|
| Metallic bead | 4.5 | 5070 |
| Glass bead | 1.5 | 1500 |
| Glass bead | 2 | 1500 |
| Glass bead | 3 | 1500 |
| Glass bead | 4 | 1500 |
| Glass bead | 5 | 1500 |
| Glass bead | 6 | 1500 |
| Glass bead | 10 | 1500 |

TABLE-continued

| Material | Equivalent diameter (mm) | Tamped density (kg/m$^3$) |
|---|---|---|
| Zeolite A | 1.25 | 650 |
| Zeolite B | 0.98 | 740 |
| Zeolite C | 1.6 | 680 |
| Zeolite D | 2.0 | 650 |
| Zeolite E | 2.5 | 650 |
| Activated alumina A | 3.3 | 770 |
| Activated alumina B | 5.0 | 770 |
| Activated carbon A | 2 | 450 |
| Activated carbon A | 2.9 | 400 |

Following all the series of tests carried out, the mixtures of particles lying within the thus determined region of stability will remain homogeneous over time in PSA applications.

It is observed that it is possible to produce mixtures that remain homogeneous under the operating conditions of PSA even by using particles of relatively different densities as long as the ratio of the densities (Rdensity) remains below a value defined as a function of the ratio of the equivalent diameters (Rdiameter).

By adopting a simple relationship, namely the curves from FIG. 1, it is possible to show that the ratio of the densities which makes it possible to be in a stable zone is a function of the ratio of the diameters, namely:

$$R\text{density} \leq 5.5 - (2 \cdot R\text{diameter}) \text{ (dotted-line curve)}$$

and preferably, in a safer fashion:

$$R\text{density} \leq 5 - (2 \cdot R\text{diameter}) \text{ (solid-line curve)}$$

It is recalled that, as indicated previously, Rdensity is the ratio of the density of the heaviest material to that of the lightest, and Rdiameter is the ratio of the equivalent diameter of the largest particle to that of the smallest particle.

For example, in the case of an adsorbent having a diameter of 3 mm and a density of 400 kg/m$^3$ as a mixture with an agglomerate having a diameter of 2 mm and a density of 800 kg/m$^3$, Rdiameter is the ratio of the diameter of the adsorbent to that of the agglomerate (i.e. 3/2=1.5), whilst Rdensity is the ratio of the density of the agglomerate to that of the adsorbent (i.e. 800/400=2).

This means that if an adsorbent has, as a property, a diameter of 2 mm and a density of 500 kg/m$^3$, the PCM agglomerate may, for example:
  in order to have an identical equivalent diameter (Rdiameter=1), have a density between around 145 kg/m$^3$ and 1750 kg/m$^3$, preferably have a density between around 170 kg/m$^3$ and 1500 kg/m$^3$; and
  in order to have an equivalent diameter of 1 mm or 4 mm (Rdiameter=2), have at most a density between around 335 kg/m$^3$ and 750 kg/m$^3$.

Most of the industrial PSA units use adsorbents having equivalent diameters that range from 0.8 mm to 3.2 mm approximately with densities ranging from around 400 kg/m$^3$ for the lightest to around 800 kg/m$^3$ for the heaviest, such as activated alumina, exchanged zeolite, etc.

It can be seen that a PCM agglomerate having a diameter of 1.6 mm and a bed density of 540 to 600 kg/m$^3$ may constitute a particle that can be very widely used and therefore which may be mass produced with attractive costs.

More specifically, the large-size industrial PSA units installed in large industrial complexes generally use adsorbents having an equivalent diameter ranging from 1.6 to 3.3 mm with densities ranging from around 400 kg/m$^3$ for the lightest to around 800 kg/m$^3$ for the heaviest. It can be seen that for all these units, an agglomerate having an equivalent diameter between 2 and 3 mm with a density of 500 to 600 kg/m$^3$ is suitable.

Conversely, the rapid PSA units or RPSA units, such as medical oxygen concentrators or generators and H$_2$ PSA units for fuel cells generally use adsorbents having a smaller diameter, generally between 0.8 and 1.6 mm. Hence, an agglomerate having an equivalent diameter of 1 to 1.5 mm with a density of 500 to 600 kg/m$^3$ then covers the majority of these processes.

The mixing between particles of adsorbents and PCM agglomerate according to the invention may be carried out for example when the adsorbent is being bagged or put into barrels according to the ratio used for the process or during the packing of the unit.

The first solution is preferably used since it is easier to implement. From experience, the transport carried out under normal conditions does not constitute a more critical step for the adsorbent/PCM mixture than the actual operation of the unit; there is no observation of segregation as a function of the size for example. The packing of the adsorbents will be adapted so that it cannot itself cause a segregation of the various particles.

It is advisable in all cases that this agglomerate can act as a heat sink as explained previously.

The thermal conductivity of the micro-encapsulated PCMs, generally of the order of 0.2 W/(m·K), may be insufficient to provide an agglomerate of millimeter size formed solely from these microcapsules with a thermal conductivity compatible with the rapid cycles of PSA type and even more of RPSA type.

This point was verified by carrying out pelletizing tests with paraffinic PCMs micro-encapsulated in melamine-formaldehyde capsules.

The micro-encapsulated PCM powder was placed in the compartment of a pelleting press and various pressures were applied, namely pressures from 2 to 1800 bar.

The pellets obtained were between 4 and 7 mm in thickness, the thickness being controllable by the amount of powder introduced into the compartment, and 2 cm in diameter. Most of the pellets obtained could be handled and were able, in this form, to be introduced into an adsorber. The density of the pellets obtained was between 500 and 1000 kg/m$^3$, whilst the density of the PCM microcapsule powder was around 300 to 400 kg/m$^3$.

The thermal conductivity varies relatively little with the compacting pressure and was between 0.1 and 0.3 W/(m·K) depending on the samples. Such values do not make it possible to use these agglomerates in the majority of PSA units knowing that for example, for PCM agglomerates in flat plate form having a thickness of a few mm, the thermal conductivity must be greater than 0.5 W/(m·K) to obtain a characteristic thermal conductivity time compatible with the majority of PSA processes.

According to one improvement of the invention, the thermal conductivity of the PCM agglomerate is therefore increased up to a value which is suitable for the cycle time of the PSA or RPSA process.

The thermal conductivity of the PCM agglomerate according to the invention is measured at a temperature such that at no time during said measurement is the PCM changing phase. Generally, a PCM changes phase in a temperature zone between a minimum phase change temperature and a maximum phase change temperature.

According to the invention, the thermal conductivity of the PCM agglomerate is measured at a temperature above the maximum phase change temperature, preferably at least 5° C.

above the maximum phase change temperature and, preferably, between 5 and 20° C. above the maximum phase change temperature.

In this way, one is assured of never encountering the phase change during the determination of the thermal conductivity of the agglomerate, since one of the possible methods for determining the thermal conductivity of the agglomerates involves supplying energy to the agglomerate, according for example to the "Hot Disk" protocol described in Gustafsson S E et al., Phys D: Appl Phys 12, 1411 (1979) or Gustafsson S E et al. J Phys D: Appl Phys 19, p. 727 (1986) or SE-A-461,797, U.S. Pat. No. 5,044,767 or Gustafsson S E. Rev. Sci.; Instrum. 62, 797 (1991).

The "hot disk" method is one possible method, but the thermal conductivity of the PCM agglomerate may be determined by any other method known in the prior art.

It may be that the geometry of the agglomerate as is may lend itself directly to this type of characterization, for example if the agglomerate is in the form of platelets, extrudates or pellets or, on the other hand, it may be that its geometry does not enable it to be characterized directly.

In the latter case, it is still possible to produce a sample having the same properties as the agglomerate and whose geometry enables its characterization, such a production, for example of extrudates or of pellets, having an identical formulation to that of the agglomerate.

As indicated previously, the PCM agglomerate, manufactured from micro-encapsulated PCMs, must therefore be designed so as to have, at the end, a thermal conductivity compatible with the PSA process that it is desired to improve, in practice equal to or greater than 0.5 W/(m·K) in order to obtain a characteristic thermal conductivity time compatible with the majority of PSA processes.

A first solution for increasing the conductivity of the PCM agglomerate is to combine the PCM with a conductive material. According to this method, the micro-encapsulated PCM is mixed with high thermal conductivity promoters (metallic or carbon-based fibers, particles, strips or shavings), so as to form a composite having improved thermal conductivity. The whole assembly is then, for example, pressed so as to obtain either plates, or pellets for example, having a characteristic conduction time compatible with the rapid cycle times of a PSA process, that is to say less than 30 minutes.

Compaction tests have therefore also been carried out with micro-encapsulated PCMs mixed with various other powders, such as copper and silver powders, the purpose of the addition being to increase the thermal conductivity of the pellets. Conductivities between 0.5 and 0.7 W/(m·K) were measured for these composite pellets.

Generally, it is possible to add to the PCM powder any material that can act as a thermal promoter or binder, so as to improve the mechanical or thermal properties of the pellets.

Another possible means for increasing the conductivity of the PCM agglomerate consists in first carrying out the metallization of at least one part of the outer surface of the microcapsule of the micro-encapsulated PCM by depositing on said surface at least one thermally conductive material, then in agglomerating the thus metallized PCMs. The metallization of PCM is described, for example, in FR-A-2 474 660. The metallization may be carried out simultaneously on several PCM microcapsules.

Preferably, the microcapsule is at least partially covered with a metal chosen from Cu, Ag, Fe, Ni, Pd, Al, Au, or an alloy incorporating at least one of these metals.

Figure 2:
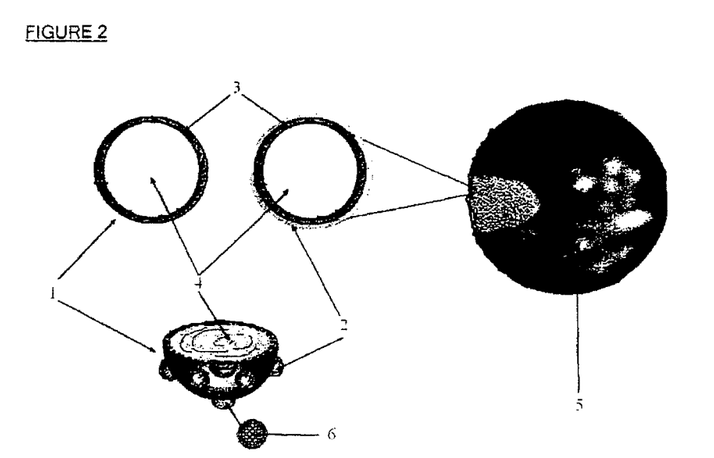
FIG. 2 illustrates the increase in surface thermal conductivity attributable to various alternatives.

In order to increase the surface thermal conductivity of the microcapsules of micro-encapsulated PCM microcapsules 1, a metallization 2 of the surface, or shell, 3 of these microspheres 1 containing the PCM 4 is carried out, as can be seen in FIG. 2, so as to then form, by stacking and compacting of the powder of said microencapsulated PCMs 1 having improved thermal conductivity, a continuous and very tight network 5 of conductive material enabling effective conduction of heat from one microsphere to the other within the agglomerate.

The metallization layer 2 of conductive material may be less than 100 nm in thickness and it is not necessarily continuous. A discontinuous deposition of clusters 6 of metal atoms onto the surface of the shell is sufficient to increase the thermal conductivity of the agglomerate of PCM microcapsules. Specifically, the thermal conductivity is a global quantity of the material, and does not meet percolation threshold criteria as is the case for electrical conductivity. For example, in the PCM agglomerate according to the invention, the diameter of the PCM microcapsules is typically less than 100 μm, preferably less than 50 μm, consequently if one part of the surface of these microcapsules, or if a restricted number of these microcapsules, is not metallized within the agglomerate, these non-metallized parts will only put up a very low thermal resistance against the overall thermal conduction of the agglomerate. It can therefore be envisaged to deposit only a discontinuous layer of conductive material on the surface of the microspheres, as a function of the desired conductivity, and thus the thermal kinetics are controlled while economizing on the consumption of conductive material.

Proceeding in this way has a certain number of advantages, in particular:

- a conductive PCM matrix is obtained while retaining the advantages of the micro-encapsulation, namely ease of handling, of implementation, tamped PCMs;
- after compaction of the powder an agglomerate is created that is provided with a continuous and very tight conductive network, the mesh of which is equal to the diameter of the microspheres, that is to say 50 nm to 50 μm, preferably 1 to 10 μm;
- the conductive material is integrated into the PCM system;
- the shell is enhanced by giving it a thermal conductor role, and thus the phase change volume enthalpy of the system is optimized compared to a system where the thermal conductor would be added to the micro-encapsulated PCMs; and
- the degree of metallization makes it possible to control the thermal kinetics of the PCM and therefore to adapt it to a given application as a function of the cycle time, of the characteristic dimension of the agglomerate, etc.

Therefore the thermal conductivity of the polymeric shell is improved by virtue of a controlled metallization. The metallization may be carried out by various techniques, namely by thermal spraying, by spraying molten metals, by a chemical route, or by application of a paint containing metal particles. Certain metallization techniques (chemical, auto-catalytic or vacuum metallization) may require a pretreatment of the substrate, for example using ultrasounds.

The production of coatings by thermal spraying onto organic substrates is one possible route for embedding particles having a high thermal conductivity into the shell of the PCM particles. For this, it is possible to convey micro-encapsulated PCMs in a hot (~100° C.) gas stream containing the metal powder for example. The hot gas makes it possible to locally melt the surface of the shell, which enables the grains of metal to be embedded in the plastic. Thus a layer of conductive materials is formed at the surface and metallized micro-encapsulated PCMs are recovered. This method requires the use efficient cooling means in order to limit the large heat gain originating from the plasma jet and from the sprayed material.

One very similar route consists in spraying molten metals onto the PCM microcapsules. The metallic spraying of the PCM microcapsules consists in covering the cold microcapsule by spraying molten particles at a sufficient rate. The particles solidify on the surface of the substrate taking the form of a crepe. The coating is obtained by the superposition of a multitude of these crepes. The sprayable materials comprise all types and all metals or alloys, the PCM plastic microcapsules existing in the form of powders. This means that the thermal spraying is an extremely flexible technique. The sprayed materials are molten. The heat necessary for this melting operation may be supplied by the combustion of a gas mixture or by an electric arc. The flame temperatures vary from 3000° C. to 20 000° C. This temperature influences the properties of the layers obtained. The spraying rate is also a parameter that influences the properties of the depositions. Obtaining a deposition that meets specific expectations implies that the particles reaching the surface of the substrate must be in the liquid or at least pasty state, their velocity must be sufficient so that they spread out in a suitable manner over the substrate and finally it is necessary that a strong adhesion is established between the particles and the substrate.

A chemical metallization process customarily used consists of surface preparation, followed by the reduction of a metal by catalysis with an electron donor present in the solution. It depends on three essential phases: the controlled roughness of the surface, the activation generated, for example, by palladium in metallic form, and the degassing of the hydrogen inherent to the chemical reaction during the actual metallization.

A novel treatment route using specific agitation provided by powerful ultrasounds was developed recently. It is a question of subjecting the samples to a high-amplitude acoustic vibration, which causes the asymmetric implosion of cavitation bubbles directly at the surface of the substrate to be coated. Thus, without modifying either the nature of the process, or the reaction sequence, a beneficial effect is observed under certain conditions. Several parameters were first studied, and their effects measured in terms of deposition rates, adhesion and internal stress levels. It is a question of the reaction sequence (choice of the moment and duration of the ultrasonic irradiation), of the power and of the frequency of the ultrasounds. The provision of ultrasounds during the activation phase allows a better dissolution of the agglomerates of colloidal palladium to palladium metal and therefore increases the density of nucleation sites under high-frequency and high-power vibration. An improvement of around 30% in the adhesion of the coating to substrate and a substantial increase in its service life are observed when an ultrasonic irradiation of 5 watts is imposed at the beginning of the copper-plating process. A better mechanical anchoring of the first metallic layer appears when the ultrasounds are used and a reduction in the residual stress levels of the coating is observed.

"Electroless" or autocatalytic metallization of insulating materials (polymers, glasses, ceramics) is another process which requires the use of specific surface treatments that aim to improve the surface reactivity and the aptitude of the substrates for being coated, and this with a view to improving long-term stability of the metal/substrate interface. In the context of the present invention, particular emphasis is placed on "electroless" deposition of nickel or of copper onto the PCM microcapsules, the shell of which is composed of various technical polymers and on the development of novel processes leading, prior to the actual metallization, on the one hand to the grafting of nitrogen-based functional groups onto the surface of the substrates (via RF plasma treatments in $NH_3$ or $N_2$ atmosphere) and on the other hand in the formation of catalytic sites (via the chemisorption of palladium-containing species via immersion of the functionalized substrates into an acid solution of $PdCl_2$).

The deposition of metallic coatings by means of vacuum techniques offers an advantageous alternative for the metallization of PCM microcapsules. These techniques have the advantage of being relatively simple, the pretreatment (plasma treatment) and the deposition possibly taking place successively in one and the same vacuum chamber. Thus contamination of the surfaces to be covered is avoided before the metallic layer is deposited. Moreover, thanks to the vacuum processes, it is possible to deposit very thin films (of the order of nm) which makes it possible to achieve a considerable saving in materials. Another interesting point deals with the fact that besides the purely metallic layers, alloys (e.g. stainless steel) may also be deposited. The successful deposition of metallic coating layers onto plastics using vacuum techniques and the flexibility of the vacuum deposition process open up new perspectives for the metallization of PCMs, where it is desired to accurately control the layer deposited, all the more so since a continuous layer is not strictly necessary. There are two types of deposition by PVD (physical vapor deposition): evaporation and sputtering. These two processes differ in the manner of detaching the particles from the target. The PVD method has numerous advantages. Among these, mention may be made of the constant quality of the depositions, the easy automation of the process and the environmental safety.

A simple metallization method consists in dispersing the micro-encapsulated PCMs in a paint containing metal particles. There are commercially available paints that contain copper (e.g. CuPro-Cote™) nickel (Super Shield), silver (Silver Lining Paint) or other conductive materials. The micro-encapsulated PCMs are dispersed in such a paint with stirring, then the excess paint is removed by filtering over a porous medium (glass frit for example), optionally under vacuum. The metallized PCMs thus obtained are dried under vacuum and at a temperature that makes it possible to eliminate any trace of solvent. The thickness of the paint layer deposited may be controlled by the stirring rate of the dispersion, the viscosity of the paint, the residence time in the paint, etc. The excess of paint recovered may be reused in order to metallize other micro-encapsulated PCMs.

The combination of the two types of solution presented above, namely the addition of binder with a mechanical and/or thermal role and the at last partial metallization of the PCM microcapsules may be necessary for obtaining agglomerates that meet the desired physical criteria.

It is therefore understood that it is possible to obtain from PCMs that are inexpensive since they are produced in a large quantity, agglomerates having physical characteristics that can be directly mixed with the adsorbent particles and that are sufficiently conductive to be able to improve the thermal dynamics of PSA units.

This therefore concerns the majority of processes of this type and more particularly in a non-limiting fashion besides $H_2$, $O_2$, $N_2$, CO and $CO_2$ PSA units, the PSA units for fractioning syngas into at least two fractions, the natural gas PSA units intended to remove the nitrogen and the PSA units used to fractionate mixtures of hydrocarbons.

The proportion of agglomerated PCMs to be added to the adsorbent may vary depending on the PSA process in question, for example larger (30%) in a region of high adsorption and lower, or even zero, in a region where it will be a question of adsorbing traces of constituents.

A homogeneous mixture in a given layer may be desirable but local heterogeneities will not have a significant impact on the overall result, due in particular to the fact of the constant mixing of the streams of fluid in one particular medium.

It will be noted that it is not necessary to have a homogeneous distribution of the PCM over the entire volume of the adsorbent bed. For example, for an $O_2$ PSA process, it is more advantageous to place the PCM agglomerates instead in the first half of the zeolite bed.

More generally, in a multi-bed PSA process, the PCM agglomerates can only be introduced into a single one of the beds, or into one part only of one of these beds, or into certain parts only of several of these beds.

Moreover, in a given region, the distribution of the PCM agglomerate is not exactly homogeneous but may follow a certain standard deviation.

Figure 3:
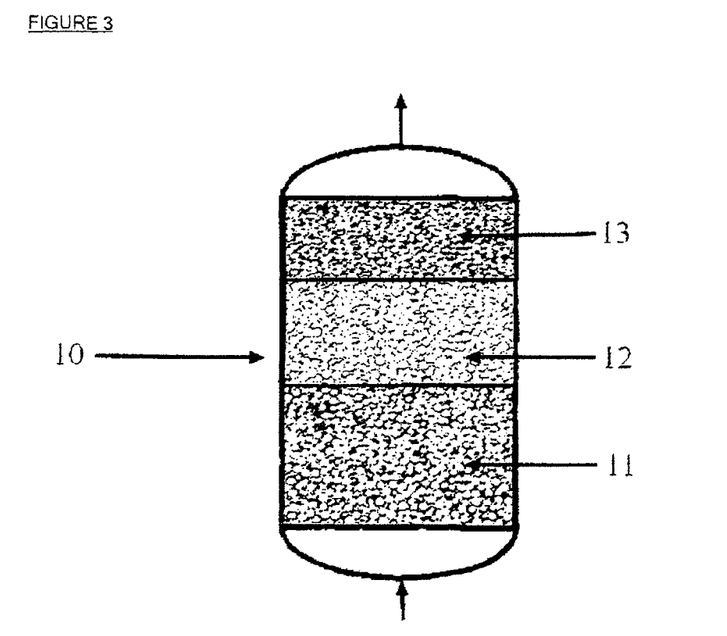
FIG. 3 illustrates an adsorber comprising several successive adsorption beds.

Represented in FIG. 3 is an adsorber 10 of a PSA unit comprising several successive adsorption beds 11, 12 and 13.

The first bed 11 is a composite adsorption bed according to the invention containing PCM agglomerates mixed with adsorbent particles for example of activated carbon, of zeolite, of silica gel or of activated alumina.

The second bed 12 is a composite adsorption bed according to the invention containing PCM agglomerates mixed with adsorbent particles, for example of activated carbon, zeolite, silica gel or activated alumina. The proportion of PCM in the beds 11 and 12 is not the same.

The third bed 13 is an adsorbent bed without PCM agglomerates.

The gas G passes successively through the first bed 11 and the second bed 12 and then the third bed 13 during the adsorption step.

EXAMPLES

The following examples are examples of applications of composite beds based on PCM in industrial PSA processes.

In the following, the terms "inlet" and "outlet" denote the inlet and outlet ends of an absorber during an adsorption step and the expression "co-current" denotes the direction of the flow of gas in the adsorber during this adsorption step whereas the term "counter-current" denotes the reverse direction of the flow of gas.

Example 1

$H_2$ PSA

The $H_2$ PSA process makes it possible to purify hydrogen from a gas mixture containing, in addition to $H_2$, at least one molecule from CO, $CO_2$, $CH_4$, $N_2$, $H_2O$ and hydrocarbons.

This gas mixture may, for example, originate from at least one source from the following sources: a steam or autothermal reformer for example a partial oxidation reactor, a Fischer-Tropsch type reactor, a natural gas line, any line in a gas network of a petrochemical plant or of a refinery.

An $H_2$ PSA unit usually contains several adsorbers, typically between 3 and 25 adsorbers, as shown in documents U.S. Pat. Nos. 4,834,780 or 4,475,929, and may produce from 5 $Sm^3/h$, for example to supply a fuel cell, as described by EP-A-1243048, to 300 000 $Sm^3/h$ of $H_2$. In the prior art there are sequential valve $H_2$ PSA units and units known as rotary $H_2$ PSA units.

An $H_2$ PSA cycle contains at least one adsorption step during which the mixture to be treated is introduced co-currently into at least one adsorber at a high pressure between 5 and 40 bar absolute, preferably between 10 and 35 bar absolute. During this step, the molecules heavier than hydrogen are adsorbed and the purified hydrogen is withdrawn at the outlet of the adsorber.

At least one other step of the cycle of an $H_2$ PSA unit is the balancing step during which two adsorbers that are at different initial pressures are brought into contact so that the gas flows from the adsorber at higher pressure to the adsorber at lower pressure.

One of the main purposes of a balancing step is to increase the yield of $H_2$.

The balancing may be complete, that is to say that the pressures are substantially equal in the two adsorbers at the end of the step, or partial, that is to say that the pressures are substantially different in the two adsorbers at the end of the step.

Yet another step of the cycle of an $H_2$ PSA process is the regeneration step during which the adsorber is decompressed counter-currently to a low regeneration pressure.

Generally, the regeneration pressure of an $H_2$ PSA process is between 1 and 3 bar, but it is possible, in certain cases, that this regeneration pressure is higher, typically between 3 and 9 bar, preferably between 5 and 7 bar.

The purpose of the regeneration step, which consists in desorbing and in evacuating some of the gas molecules still adsorbed, is to re-establish the adsorption capacity of the adsorbents.

This step may be partially or completely coupled with a purge by an elution gas introduced at the outlet of the adsorber and flowing counter-currently.

Yet another step of the $H_2$ PSA cycle is the recompression step, during which the pressure of the adsorber is raised to substantially the high pressure, so as to be able to then again carry out the adsorption step and thus start the following cycle.

Another possible step of the cycle consists in recycling some of the gas evacuated during a regeneration step toward the inlet of the $H_2$ PSA. The purpose of this recycling is to improve the $H_2$ yield. The cycle time of an $H_2$ PSA process is between 1 minute and 30 minutes, preferably between 5 minutes and 15 minutes.

Certain RPSA units in the process of being developed could nevertheless have cycle times of less than one minute and require agglomerates with improved thermal conductivity, for example an $H_2$ PSA unit associated with a fuel cell.

Example 2

$O_2$ PSA

The $O_2$ PSA process makes it possible to produce, at the outlet of the adsorber, oxygen at a purity between 70 and 99% by volume, preferably of between 80 and 95%, by selective adsorption of the nitrogen present in the air.

Simultaneously, an $O_2$ PSA process is also capable of producing nitrogen-enriched air at the inlet of the adsorber, during the regeneration steps. $O_2$ PSA processes are used for example:

in the medical field for producing breathable air enriched or depleted in oxygen, as described for example in WO-A-2003/090903, WO-A-2005/028059, U.S. Pat. No. 5,906,672 or U.S. Pat. No. 6,793,719. In the case of medical $O_2$ PSA processes delivering oxygen-enriched air, the flow rates of oxygen delivered per unit are typically between 0.5 and 300 Sl/min. Some of these PSA units may be portable as described, for example, in WO-A-2003/064009, WO-A-2004/054493, EP-A-1307278 or WO-A-02/09848.

In the aeronautical field, such as onboard $O_2$ PSA units, for delivering oxygen-enriched air onboard a vehicle in flight. These PSA units are often called OBOGS (On Board Oxygen Generator Systems). Such systems are described for example in WO-A-02/04076, EP-A-1400275 or EP-A-1374972.

In these first two applications, it may be a question of RPSA units also requiring PCM agglomerates having improved thermal conductivity.

In industry, for example in metallurgy, the glass industry, fish farming or water treatment.

An $O_2$ PSA unit usually contains several adsorbers, typically between 1 and 3 adsorbers, and may produce from 0.03 $Sm^3/h$ (for example medical $O_2$ PSA units) to 10 000 $Sm^3/h$ of $O_2$.

The $O_2$ PSA units generally operate using sequential valves. However, for small-size $O_2$ PSA units (typically, for example, medical $O_2$ PSA units), rotary $O_2$ PSA technologies have also been developed, as described, for example, in EP-A-1 235 630, WO-A-9828013, WO9901202, EP-A-1 355 717, U.S. Pat. Nos. 6,488,747, 6,311,719 or WO-A-05025722. An $O_2$ PSA cycle contains at least one adsorption step during which the air, which may be pretreated to remove various possible impurities ($H_2O$, $CO_2$, hydrocarbons, etc.) is introduced co-currently into at least one adsorber at a high pressure between 1 bar absolute and 8 bar absolute, preferably between 1.1 bar absolute and 6 bar absolute. During this step, the nitrogen is preferably adsorbed and an oxygen-enriched gas is withdrawn at the outlet of the adsorber. Another possible step of the cycle of an $O_2$ PSA unit is the balancing step during which two adsorbers that are at different initial pressures are brought into contact so that the gas flows from the adsorber at higher pressure to the adsorber at lower pressure. One of the main purposes of balancing is to increase the $O_2$ yield. The balancing may be complete (that is to say that the pressures are substantially equal in the two adsorbers at the end of the step) or partial (that is to say that the pressures are substantially different in the two adsorbers at the end of the step). Yet another step of the cycle of an $O_2$ PSA unit is the regeneration step during which the adsorber is decompressed counter-currently to a low regeneration pressure. Generally, the regeneration pressure of an $O_2$ PSA unit is between 200 mbar and 1.5 bar, depending on the high adsorption pressure. The purpose of the regeneration step, which consists in desorbing and in evacuating some of the nitrogen molecules still adsorbed, is to reestablish the nitrogen adsorption capacity of the adsorbents. This step may be partially or completely coupled with a purge of an elution gas rich in oxygen introduced at the outlet of the adsorber and circulating counter-currently, so as to again lower the partial pressure of nitrogen. Yet another step of the $O_2$ PSA cycle is the recompression step, during which the pressure of the adsorber is increased to substantially the high pressure, so as to then be able to again carry out the adsorption step and thus start the following cycle. The recompression may be carried out with the feed air or with an oxygen-rich gas. The cycle time of an $O_2$ PSA process is between 5 seconds and 5 minutes, preferably between 10 seconds and 2 minutes.

Example 3

$CO_2$ PSA

The $CO_2$ PSA process makes it possible to produce a decarbonated gas on the one hand and a $CO_2$-enriched gas on the other hand from a feed gas containing $CO_2$. The decarbonated gas contains between 0.1 and 15% of residual $CO_2$, preferably between 1 and 8% of residual $CO_2$. The $CO_2$-enriched gas contains between 10 and 99% of $CO_2$ (JP-A-2003-001061), preferably between 50 and 96% of $CO_2$. In a $CO_2$ PSA process, the $CO_2$ is adsorbed and recovered during the regeneration step and the unadsorbed decarbonated gas is recovered at the outlet of the adsorber during the adsorption step. There are, in the prior art, rotary $CO_2$ PSA units (U.S. Pat. No. 6,500,236) for which the invention may also be applied. The $CO_2$ PSA units may be used to treat gases containing between 400 ppm and 80% of $CO_2$, preferably between 5% and 50% of $CO_2$, and may be applied, for example, in the metallurgy industry, for example for the decarbonation of gases resulting from DRI, Corex, Midrex, HYL or blast furnace processes (U.S. Pat. Nos. 6,562,103 5,582,029, 5,858,057, 5,676,732) in the paper industry, in the lime industry, in the cement industry, in power stations (JP 2003-001061), in IGCC processes (EP-A-1142623, U.S. Pat. No. 5,582,029), in the treatment of natural gas or of natural biogas, or for decarbonating a confined medium, for example in submarines or in diving. A $CO_2$ PSA unit usually contains several adsorbers, typically between 1 and 15 adsorbers (JP-A-2000-354726). A $CO_2$ PSA cycle contains at least one adsorption step during which the gas stream containing the $CO_2$, which may be pretreated to eliminate various possible impurities ($H_2O$, hydrocarbons, metals, sulfur-containing or chlorine-containing compounds, dust, etc.), is introduced co-currently into at least one adsorber at a high pressure between 1 bar absolute and 50 bar absolute, preferably between 1.1 bara and 10 bara. During this step, the $CO_2$ is preferably adsorbed and a $CO_2$-depleted gas is withdrawn at the outlet of the adsorber. Another possible step of the cycle of a $CO_2$ PSA unit is the balancing step during which two adsorbers that are at different initial pressures are brought into contact so that the gas flows from the adsorber at higher pressure to the adsorber at lower pressure. One of the main purposes of balancing is to increase the yield of decarbonated gas and to improve the purity of the $CO_2$ recovered during the regeneration step. The balancing may be complete (that is to say that the pressures are substantially equal in the two adsorbers at the end of the step) or partial (that is to say that the pressures are substantially different in the two adsorbers at the end of the step). Yet another step of the cycle of a $CO_2$ PSA unit is the regeneration step during which the adsorber is decompressed counter-currently to a low regeneration pressure. Generally, the regeneration pressure of a $CO_2$ PSA unit is between 50 mbara and 2 bara, depending on the high adsorption pressure. The purpose of the regeneration step, which consists in desorbing some of the $CO_2$ molecules previously adsorbed, is to reestablish the $CO_2$ adsorption capacity of the adsorbents and to produce a stream enriched in $CO_2$. This step may be partially or completely coupled with a purge of an elution gas, less rich in $CO_2$ than the desorbed gas. Yet another step of the $CO_2$ PSA cycle is the compression step, during which the pressure of the adsorber is raised to substantially the high pressure, so as to then be able to again carry out the adsorption step and thus start the following cycle. The recompression may be carried out with the feed gas or with a gas produced during the cycle. Another possible step of the cycle consists in recycling some of the $CO_2$-enriched gas obtained during a regeneration step to the $CO_2$ PSA unit. The purpose of this recycling is to improve the yield of decarbonated gas and to improve the purity of the $CO_2$ recovered during the regeneration step. Another possibility for globally improving the separation performances of a plant using a $CO_2$ PSA unit consists in coupling this $CO_2$ PSA unit with a second separation unit, for example another PSA unit or a membrane separation unit or a cryogenic separation unit. The cycle time of a $CO_2$ PSA process is between 1 minute and 30 minutes, preferably between 2 minutes and 20 minutes.

Example 4

$N_2$ PSA

The $N_2$ PSA process makes it possible to produce nitrogen at a purity between 70 and 99.9%, preferably between 80 and 98%, by preferably adsorbing the oxygen present in the air. The $N_2$ PSA units generally use a carbon-based molecular sieve. There are also PSA units that make it possible to co-produce oxygen and nitrogen: cf. WO-A-2004054493 and WO-A-2003086586.

Example 5

Other Applications

The invention may be used, in addition, in one of the following processes:

- An argon PSA process as described, in particular, in U.S. Pat. Nos. 6,544,318, 6,432,170, 5,395,427 or 6,527,831. The Ar PSA process makes it possible to produce oxygen at a purity greater than 93%, by preferably adsorbing either argon, or oxygen, present in an $O_2$ rich stream originating, for example, from an $O_2$ PSA unit. Ar PSA units generally use a carbon-based molecular sieve or a silver-exchange zeolite (U.S. Pat. No. 6,432,170).
- An He PSA process which makes it possible to produce helium by preferably adsorbing the other molecules present in the feed stream.
- Any PSA process enabling the separation between an alkene and an alkane, typically ethylene/ethane or propylene/propane PSA processes for example. These separations rely on a difference in the adsorption kinetics of the molecules on a molecular sieve that may or may not be carbon based.
- Any PSA process that makes it possible to fractionate a synthesis gas (syngas).
- Any PSA process that makes it possible to separate $CH_4$ from $N_2$.
- SERP (Sorption Enhanced Reaction Process) coupling the steam methane reforming reactions with the in situ capture of $CO_2$ by adsorption. The principle of the SERP is described in several documents (U.S. Pat. No. 6,103,143, Hufton et al., "Sorption enhanced reaction process (SERP) for the production of hydrogen", 1998). The overall steam methane reforming reaction consists in reacting methane with steam so as to produce hydrogen and $CO_2$. By eliminating the $CO_2$ by adsorption during the steam reforming (onto an adsorbent, for example hydrotalcite), the equilibrium is shifted toward the production of hydrogen and the hydrogen is produced at a greater purity. The PCM agglomerates may be placed in the $CO_2$ adsorption bed of the SERP so as to reduce the thermal effects due to the adsorption and therefore to adsorb larger amounts of $CO_2$.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A PSA process for separating and/or purifying a gas mixture containing several constituents by adsorption, using one or more adsorbers that each contain at least one bed of adsorbent particles to adsorb at least one of the constituents of said gas mixture onto said adsorbent particles, each adsorber being subjected to adsorption/desorption cycles comprising steps of adsorption and of desorption, said at least one adsorbent bed contained in each adsorber comprises, in addition, particles of at least one phase change material (PCM), said PCM particles are in the form of agglomerates of several PCM microcapsules, said agglomerates being mixed with the adsorbent particles so as to form a composite bed comprising said adsorbent particles and said micro-encapsulated PCM agglomerates, wherein:

the density of the PCM agglomerates is different from the density of said at least one adsorbent with which they are mixed in the composite bed; and the ratio of the densities of the PCM agglomerates and of the adsorbent particles (Rdensity) in the composite bed is such that:

$$Rdensity \leq 5.5 - (2 \cdot Rdiameter)$$

where:

Rdensity is the ratio of the densities of the PCM agglomerates and of the adsorbent particles;

Rdiameter is the ratio of the equivalent diameters of the PCM agglomerates and of the adsorbent particles; and the numerators and denominators of said Rdensity and Rdiameter ratios being chosen in order to have:

$$1 \leq Rdensity \leq 3.5 \text{ and } 1.0 \leq Rdiameter \leq 2.25.$$

2. The process of claim 1, wherein the ratio of the densities Rdensity is such that: $Rdensity \leq 5 - (2 \cdot Rdiameter)$, the numerators and denominators of said Rdensity and Rdiameter ratios being chosen in order to have:

$$1 \leq Rdensity \leq 3.0 \text{ and } 1.0 \leq Rdiameter \leq 2.0.$$

3. The process of claim 1, wherein the PCM agglomerates have a density between 400 and 1200 $kg/m^3$.

4. The process of claim 3, wherein the PCM agglomerates have a density between 500 and 900 $kg/m^3$.

5. The process of claim 4, wherein the PCM agglomerates have a density between 500 and 600 $kg/m^3$.

6. The process of claim 3, wherein the PCM agglomerates have a diameter between 0.5 and 3 mm.

7. The process of claim 6, wherein the PCM agglomerates have a diameter between 2 and 3 mm.

8. The process of claim 7, wherein the PCM agglomerates have a diameter between 1 and 1.5 mm.

9. The process of claim 1, wherein the PCM contained in the PCM agglomerates is chosen from the group consisting of paraffins, fatty acids, nitrogen-containing compounds, oxygen-containing compounds, phenyls and hydrated salts or a mixture of these compounds.

10. The process of claim 1, wherein the PCM agglomerates comprise a binder that represents less than 30% by volume of the PCM agglomerates.

11. The process of claim 1, wherein the PCM agglomerates comprises a binder chosen from the group consisting of clays, hydraulic binders, polymers, adhesives, and resins.

12. The process of claim 11, wherein carbon or metal fibers are added to said binder.

13. The process of claim 1, wherein the PCM agglomerates have a thermal conductivity greater than 0.3 W/(m·K).

14. The process of claim 13, wherein the PCM agglomerates have a thermal conductivity greater than 0.5 W/(m·K).

15. The process of claim 1, wherein the PCM agglomerate comprises metallized micro-encapsulated PCMs.

16. The process of claim 15, wherein the surface metallization is continuous or discontinuous, and/or is carried out on several PCM microcapsules.

17. The process of claim 15, further comprising a thermally conductive material that is deposited on the PCM, wherein the thermally conductive material deposited is a metal chosen from the group consisting of Cu, Ag, Fe, Ni, Pd, Al, Au, or an alloy incorporating at least one of these metals.

18. The process of claim 1, wherein the PSA process is selected from the group consisting of $H_2$ PSA, $O_2$ PSA, $N_2$ PSA and $CO_2$ PSA processes.

19. The process of claim 1, wherein the gas mixture is selected from the group consisting of a gas rich in $H_2$, $O_2$, CO, $N_2$, $CO_2$ and mixtures thereof.

20. The process of claim 1, wherein a gas containing at least 50% by volume of $H_2$, $O_2$, CO, $N_2$, $CO_2$ or mixtures thereof is produced.

21. The process of claim 1, where several successive adsorption beds are utilized, at least one of which is a composite bed formed of PCM agglomerates mixed with the adsorbent particles.

22. The process of claim 1, wherein the gas to be treated flows radially or axially in the adsorber containing the composite bed.

23. The process of claim 1, wherein each adsorption/desorption cycle has a cycle time of less than 30 minutes.

* * * * *